United States Patent [19]

Kemper

[11] Patent Number: 5,794,753
[45] Date of Patent: Aug. 18, 1998

[54] CONTROLLED FORCE ACTUATOR SYSTEM

[76] Inventor: Yves J. Kemper, 3 cours des Longs Prés, 92100 Boulogne-Billancourt, Paris, France

[21] Appl. No.: 791,524

[22] Filed: Jan. 30, 1997

Related U.S. Application Data

[60] Provisional application No. 60/010,816 Jan. 30, 1996.

[51] Int. Cl.$^6$ .................................................. F16D 13/71
[52] U.S. Cl. ............................ 192/89.25; 192/89.22; 192/70.27; 267/161
[58] Field of Search ..................... 192/89.22, 89.23, 192/89.24, 89.25, 70.27; 267/161

[56] References Cited

U.S. PATENT DOCUMENTS

| | | |
|---|---|---|
| 2,325,193 | 7/1943 | Nutt ............................... 267/161 |
| 3,868,100 | 2/1975 | Maucher . |
| 4,300,669 | 11/1981 | Browne ............................ 192/89.25 |
| 4,602,708 | 7/1986 | Nagano . |
| 4,623,055 | 11/1986 | Ohkubo . |
| 4,696,384 | 9/1987 | Huber . |
| 4,949,829 | 8/1990 | Tojima et al. . |
| 5,088,583 | 2/1992 | Takeuchi et al. . |
| 5,148,904 | 9/1992 | Takashi et al. . |
| 5,236,070 | 8/1993 | Simoncic et al. . |
| 5,400,887 | 3/1995 | Mizukami et al. . |
| 5,409,091 | 4/1995 | Reik et al. . |
| 5,551,547 | 9/1996 | Mizukami et al. . |
| 5,579,881 | 12/1996 | Weidinger ................. 192/89.23 X |
| 5,636,721 | 6/1997 | Weidinger ..................... 192/70.27 |

FOREIGN PATENT DOCUMENTS

| | | |
|---|---|---|
| 0 718 517 A1 | 6/1996 | European Pat. Off. . |
| 40 02 648 A1 | 8/1990 | Germany . |
| 2 120 329 | 11/1983 | United Kingdom . |
| 2 287 994 | 4/1995 | United Kingdom . |

*Primary Examiner*—Richard M. Lorence
*Attorney, Agent, or Firm*—Finnegan, Henderson, Farabow, Garrett & Dunner, L.L.P.

[57] ABSTRACT

A controlled force actuating system having a positive Belleville spring and a negative Belleville spring arranged in series between a load member and a reaction member. The positive Belleville spring is initially in a relaxed condition and the negative Belleville spring being initially in a loaded energy storing condition. The negative Belleville spring is an outer annular portion of a diaphragm having a peripheral outer edge and at least on integral finger radiating inwardly from the outer annular portion. The positive Belleville spring is an annulus having inner and outer edges, the inner edge of the annulus lying outside the peripheral outer edge of the diaphragm. A hinge device is provided for pivotally connecting the outer edge of the diaphragm to the inner edge of the annulus. Thus, energy stored in the negative Belleville spring may be applied between the load member and the reaction member, through the positive Belleville spring by an axial control force applied to the at least one finger.

4 Claims, 4 Drawing Sheets

CONTROLLED FORCE ACTUATOR SYSTEM

This application claims the benefit of U.S. Provisional Application entitled CONTROLLED FORCE ACTUATOR SYSTEM, Ser. No. 60/010,816, filed Jan. 30, 1996, the disclosure of which is incorporated by reference.

BACKGROUND OF THE INVENTION

This invention relates to controlled force actuating systems and more particularly, to an actuating system in which an actuating force is supplied by controlled release of a loaded spring. The actuating system is particularly applicable to the development of normal forces for friction devices such as power transmitting clutches or friction brakes but is also useful in other applications.

Automotive power transmitting or starting clutches represent one of the more challenging applications of controlled force actuating systems in which a relatively large amount of energy stored in a spring must be controlled during release and restored to the spring. Such clutches employ frictionally engaged torque transmitting components which must remain fixed to each other by the spring force without slippage when fully engaged, and which must be engaged under control to avoid an abrupt transition of power transmission during engagement. Traditionally, the relatively large force actuating springs of automotive clutches have been operated by control systems involving levers, ball ramps or other force reduction devices by which the actuating spring may be controlled by a foot pedal, for example.

The conventional control systems for automotive starting clutches are not only complex and space consuming, but also, they are not suited to automation because of the large amounts of energy required for their operation. In this latter respect, the development of on-board computers in automotive vehicles has given rise to much interest in automating the operating of starting clutches and the power transmissions with which they are used. In spite of many recent attempts to accomplish such automation, the energy requirements to retract and control the release of the clutch spring have been a major obstacle.

Hence, there is an acute need for a controlled force actuating system by which a large spring force can be exerted but which can be operated by a relatively small amount of control energy. This need exists not only in automatic clutch applications, but also in numerous other applications where spring stored energy is released and retracted to and from a load.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the controlled force actuating system of the invention includes a positive Belleville spring and a negative Belleville spring arranged in series between a load member and a reaction member. The positive spring is initially in a relaxed condition and the negative Belleville spring is initially in a loaded energy storing condition. The negative Belleville spring is an outer annular portion of a diaphragm having a peripheral outer edge and at least on integral finger radiating inwardly from the outer annular portion. The positive Belleville spring is an annulus having inner and outer edges, the inner edge of the annulus lying outside the peripheral outer edge of the diaphragm. A hinge device is provided for pivotally connecting the outer edge of the diaphragm to the inner edge of the annulus. Thus, energy stored in the negative Belleville spring may be applied between the load member and the reaction member, through the positive Belleville spring by an axial control force applied to the at least one finger.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 6:
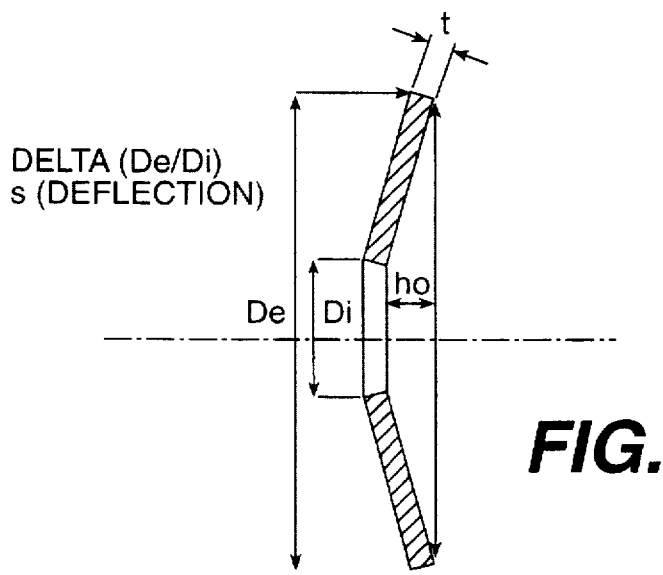
FIG. 6 is a cross-section illustrating parameters of a Belleville spring.

Because the operation of the actuating system of the invention is dependent largely on the characteristics of a negative Belleville spring, reference is first made to FIG. 6 in which the dimensions of a typical Belleville spring Bs are indicated to include an outside diameter DE, an inside diameter DI, a thickness t, and a conical height ho.

Figure 4:
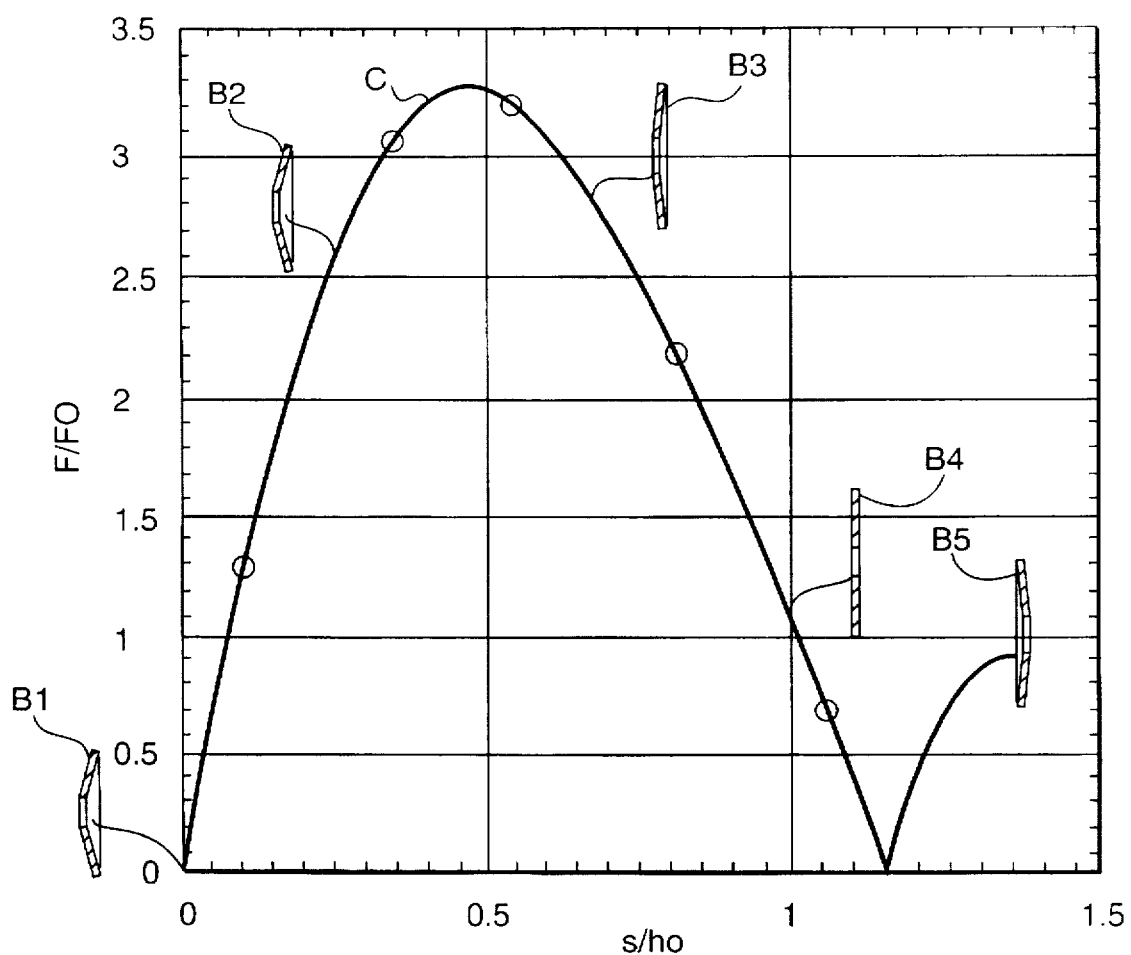
FIG. 4 is a graph illustrating force versus deflection characteristics of a Belleville spring.

An example of the force deflection characteristics of a Belleville spring are illustrated in FIG. 4. In particular, relative units of force are given on the ordinate of the curve C in FIG. 4 whereas relative units of deflection are indicated on the abscissa. In a state of rest, the Belleville spring will be in the condition illustrated in FIG. 6, for example. This state is also illustrated by an icon Bi in FIG. 4 when F/Fo=0 and s/ho=0. If an axial force F is applied to the Belleville spring, a deflection s in an axial direction will occur, as represented by the reduced height of the icon B2, but with the applied force increasing to a maximum as illustrated on the side of the curve C shown in FIG. 4 to the left of the top of the curve C representing a deflection s/ho of approximately 0.45. With continued deflection, depicted by the icons B3, B4 and B5, the applied force begins to reduce after reaching the maximum, and diminishes on the side of the curve C to the right of the top of the curve C, down to zero. In this deflection process, it will be noted that when s/ho=1, the configuration of the Belleville spring will have reached a flat configuration, as represented by the icon B4. Also, after passing the flat configuration, the applied force is further reduced along the curve C to zero, and at maximum deflection, is inverted or cocked as depicted by the icon B5.

The term "negative Belleville spring" is used herein and in the appended claims to designate a Belleville spring that is initially loaded with energy and that operates between s/ho=0.45 and 1.25 in the example of FIG. 4, or generally between the maximum spring force and zero with the spring inverted. The term "positive Belleville spring" is used to designate a Belleville spring that is initially unloaded or relaxed and that operates along the left side of the curve C shown in FIG. 4, or a spring that is deflected generally between its initial shape and a point of maximum stored spring force.

An important feature of the negative Belleville spring is that when it releases the energy stored therein from the condition represented by the icon B5, the force of the released energy increases from minimum to maximum values as deflection s is decreased as represented by the right side of the curve C shown in FIG. 4.

In accordance with the present invention, a force actuator system is provided in which two springs are used in series, one of the two springs being a negative Belleville spring, whereas the other is a positive spring, preferably a positive Belleville spring. Thus, the negative Belleville spring is initially preloaded whereas the positive Belleville spring operates as a spring that can be loaded and unloaded.

Figure 2:
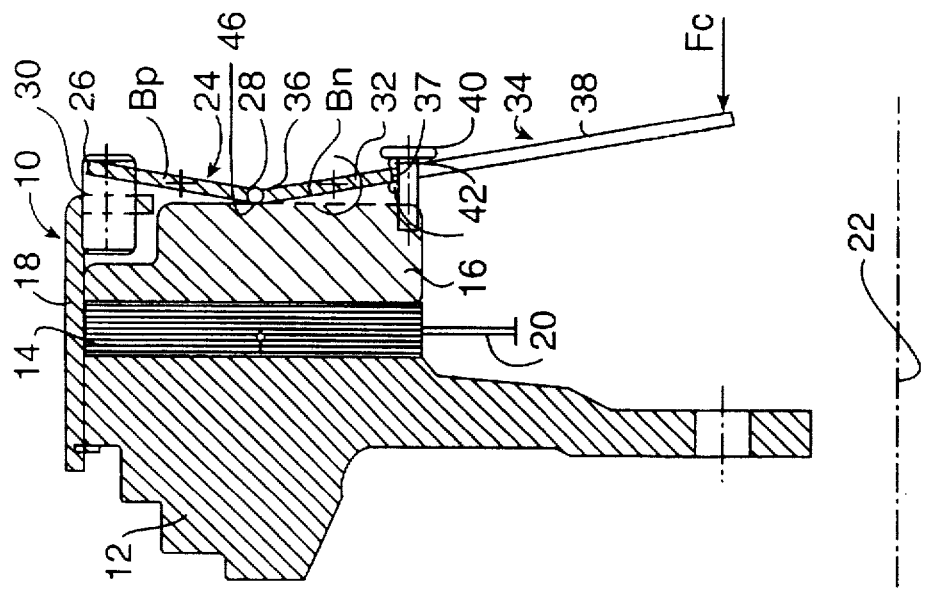
FIG. 2 is a fragmentary cross-section illustrating the actuator system of FIG. 1 in a different operating condition.
Figure 1:
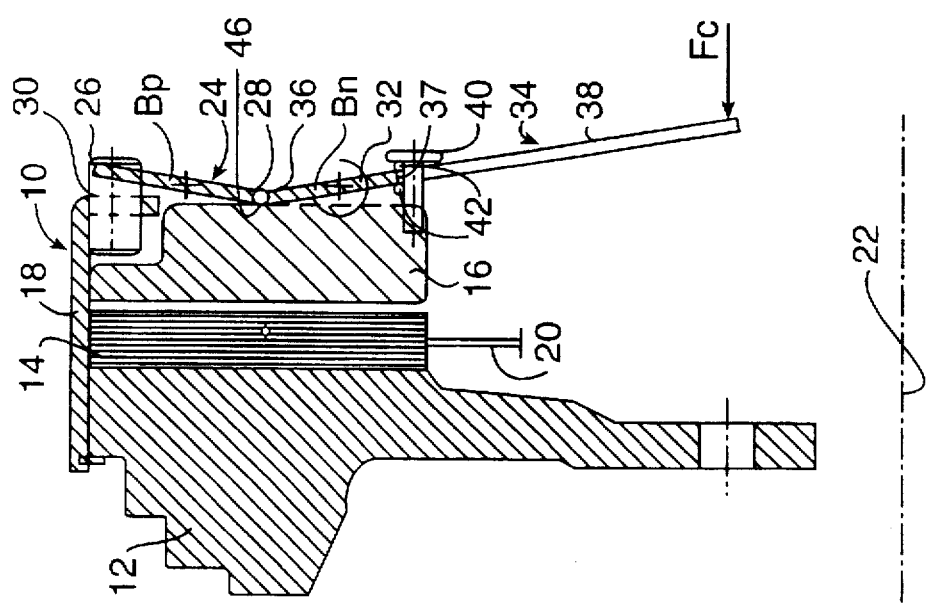
FIG. 1 is a fragmentary cross-section illustrating the actuating system of the invention applied to an automotive starting clutch shown in a disengaged or open condition.
Figure 3:
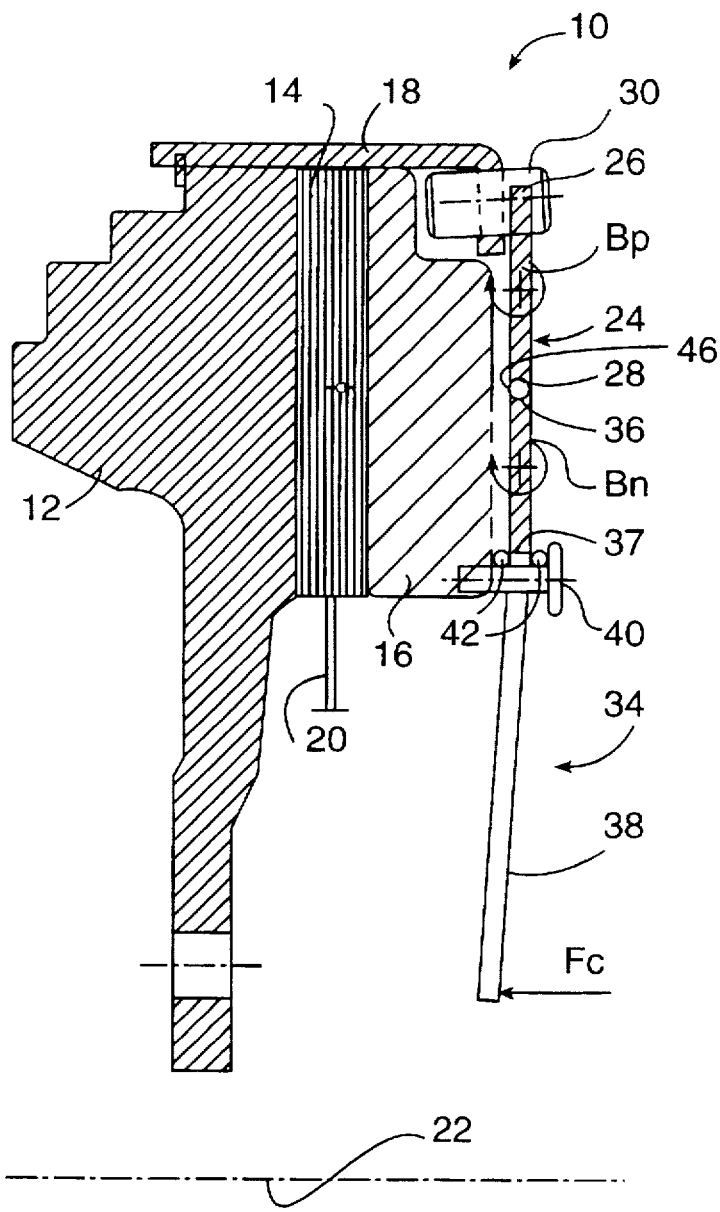
FIG. 3 is a fragmentary cross-section illustrating the actuating system in the clutch of FIG. 1 which has been completely closed.

In FIGS. 1-3, an automotive clutch organization is generally designated by the reference numeral 10 and illustrated as including such conventional components as a flywheel 12, a clutch cushion 14, a pressure plate 16, and a back plate 18. The back plate 18 is fixed to the flywheel 12 for rotation therewith and against axial displacement with respect to the flywheel 12 as is well known in the art. Also, the pressure plate 16 is connected to rotate with the flywheel, or alternatively with the back plate, by a set of springs (not shown), which apply an axial force tending to pull the pressure plate away from the flywheel. Input power is supplied to the clutch 10 through the flywheel 12. Output power is delivered from the clutch 10 through a radial disc 20, when the clutch is closed or engaged, to an appropriate output shaft (not shown). In FIGS. 1-3, only half-sections of components are shown. In practice all illustrated components are symmetrical about and rotatable on a central axis 22.

In accordance with the invention, the automotive clutch 10 is equipped with a controlled force actuating system including an initially relaxed positive Belleville spring and an initially loaded and cocked negative Belleville spring arranged in series between a load member and a reaction member. The positive Belleville spring is shaped as an annulus articulated at its inner edge with the outer peripheral edge of a diaphragm in which the negative Belleville spring is incorporated as an outer annular portion.

In the embodiment of the invention shown in FIGS. 1-3, the positive Belleville spring Bp is configured as an annulus 24 circumscribing the axis 22 and having an outer edge 26 and an inner edge 28. In the region of the outer edge 26, a plurality of cylindrical pins 30 are secured to the annulus 24 such as by welding. The pins 30 extend within openings through the back plate 18, and are freely slidable in such openings when the positive Belleville spring is in a relaxed condition as shown in FIG. 1. The pins 30 provide compensation for wear in the clutch cushion 14 in a manner that will be apparent from the description to follow.

The negative Belleville spring Bn is formed by an annular portion 32 of a circular diaphragm 34. The annular portion 32 extends radially from an outer peripheral edge 36 of the diaphragm 34, inwardly to a bearing edge 37 located at outer ends of radial slots which delineate inwardly extending radial control fingers 38 in the diaphragm 34. Capped pins 40 fixed to the pressure plate 16, and bearing wires 42, support the diaphragm from the pressure plate 16 so that the outer annular portion 32 may pivot about the bearing edge 37 thereof. The outer peripheral edge 36 of the diaphragm is articulated or hinged to the inner edge 28 of the annulus 34, forming the positive Belleville spring Bp, by a wire ring 46 seated in grooves formed in the inner edge 28 of the annulus 34 and in the outer peripheral edge 36 of the diaphragm 34.

As in conventional clutch operation, an actuating spring force is used to urge the pressure plate 16 toward the flywheel and against the clutch cushion 14. An important aspect of the present invention, however, is that the actuating spring force is controlled by a very small control force Fc applied to the control fingers 38. In particular, movement of the control fingers 38 in a direction to the left in FIGS. 1-3 will cause the negative Belleville spring Bn to start releasing force stored therein and apply an increasingly strong actuating force to the outer positive Belleville spring Bp. Since the outer positive Belleville spring is connected in series to the negative Belleville spring by the wire ring 46, it accumulates the energy released by the negative Belleville spring and a large actuating force is developed between the back plate 18 and the pressure plate 16 tending to urge the pressure plate toward the flywheel 12. Yet, only a small control force Fc is needed to control the release of energy from and return energy to the negative Belleville spring. An understanding of this operation may be gained from the graph of FIG. 5.

Figure 5:
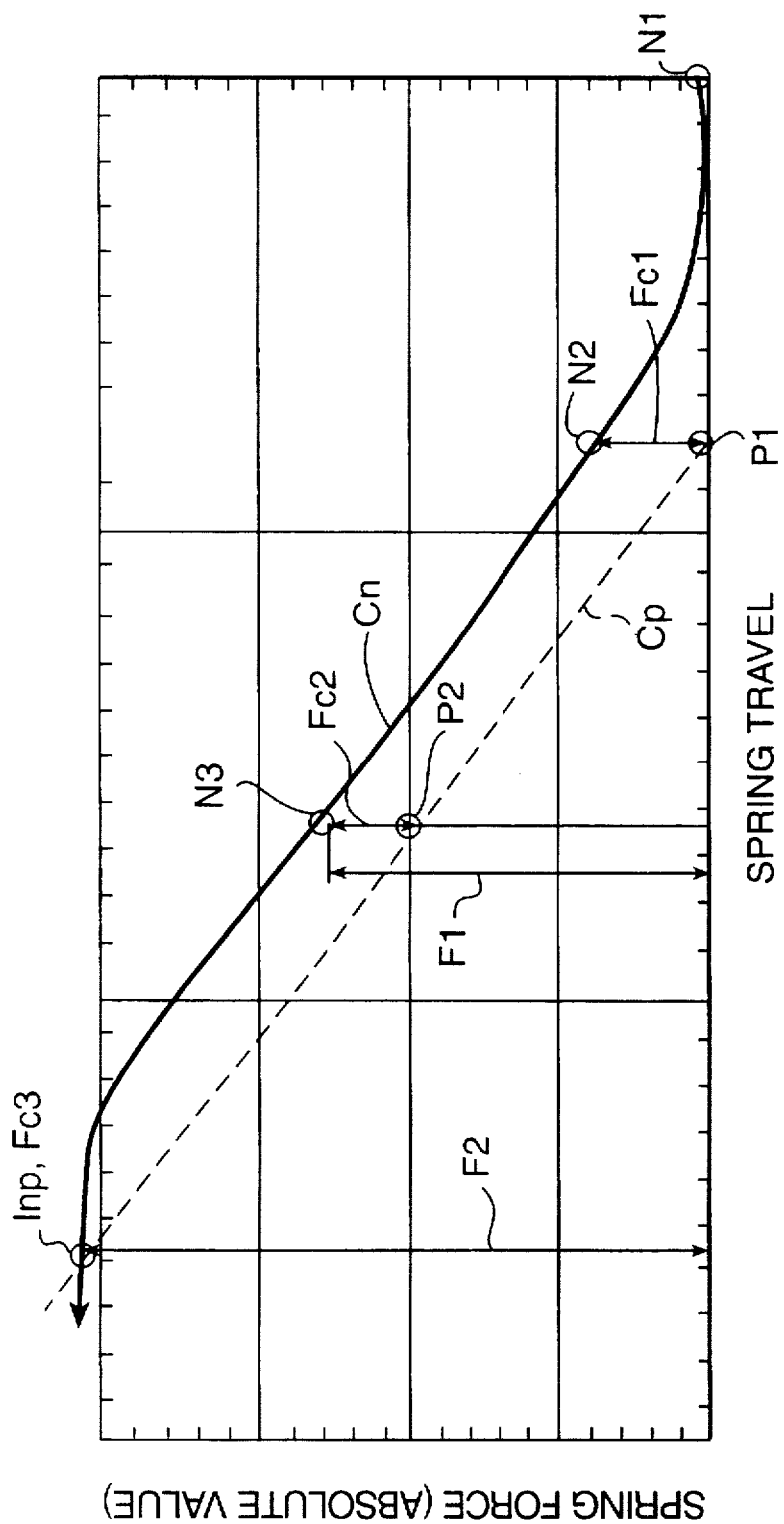
FIG. 5 is a graph in which the force/deflection characteristics of separate positive and negative Belleville springs are represented by respective curves.

In FIG. 5, two curves Cn and Cp represent respectively, the force/deflection characteristics of the Belleville springs Bn and Bp in the clutch 10. The initial condition of the negative Belleville spring Bn is represented at a point N1 on the curve Cn and the initial relaxed condition of the positive Belleville spring Bp is represented by the point P1 on the curve Cp. The vertical relationship of the two curves Cn and Cp represents a design of the Belleville springs Bn and Bp in which the amount of force released by the negative Belleville spring Bn exceeds the amount of force being stored in the positive Belleville spring Bp. Thus, in the absence of a control force Fc on the control fingers 38, in the embodiment of FIGS. 1-3, the negative Belleville spring Bn will release from its initial condition and start to load the positive Belleville spring Bn at the points P1 and N2 on the respective curves Cp and Cn. The control force Fc1 at these points is one which resists release of energy from the negative Belleville spring Bn and the magnitude of the control force Fc1 is represented by the difference in the force exerted by the Belleville spring Bn and that resisted or balanced by the positive Belleville spring Bp. As the release of energy from the negative Belleville spring Bn proceeds, the control force Fc does not change substantially as may be appreciated by the condition on the curves in FIG. 5 at points P2 and N3. Also at this point, the force exerted between the reaction member represented by the backplate 18 in the clutch 10 and the load member represented by the pressure plate 16 builds to a force F1. At the point Inp in FIG. 5 where the curves Cn and Cp intersect, the control force Fc3 becomes zero, and the composite force exerted by the two springs between the reaction member and the loaded member is increased to a maximum force F2. Moreover, the springs will remain in this condition without a control force and retain the loading force F2.

To open the clutch 10 or to move the pressure plate 18a away from the cushion pad 14, for example, the control force Fc is exerted on the control fingers 38 to reverse the transfer of energy from the now loaded positive Belleville spring Bp to the negative Belleville spring Bn, and the difference in energy supplied by the positive spring Bp and stored by the negative spring Bn is supplied by the product of control force and travel of the control cone. As in conventional foot pedal operation of an automotive clutch, the control force must be maintained to retain the clutch 10 disengaged and no control force is applied to maintain the clutch engaged.

Operation of the wear compensating pins 30 may be appreciated by the progression of clutch closing operation shown in FIGS. 1-3. As mentioned above, when the positive Belleville spring Bp relaxed, the pins 30 slide freely in the back plate 18 to find a position in the open condition of the clutch 10 as shown in FIG. 1. In FIG. 2, depicting the instant the pressure plate 16 meets resistance to travel during closure of the clutch, the negative Belleville spring Bn begins to load the positive Belleville spring Bp. When this occurs, the pins 30 bind in the back plate 18 to supply a reaction to the clutch closing force. In the fully closed position shown in FIG. 3, the pins 30 canted and bound to a maximum extent and thus retain the reaction to clutch closing force. When the clutch is again opened, the pins 30 will relocate in the back plate 18 when the positive Belleville spring Bp is unloaded and relaxed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. In a controlled force actuating system including a positive Belleville spring and a negative Belleville spring arranged in series between a load member and a reaction member, the positive spring being initially in a relaxed condition and the negative Belleville spring being initially in a loaded energy storing condition, the improvement wherein the negative Belleville spring is an outer annular portion of a diaphragm having a peripheral outer edge and at least one integral finger radiating inwardly from the outer annular portion, wherein the positive Belleville spring is an annulus having inner and outer edges, the inner edge of the annulus lying outside the peripheral outer edge of the diaphragm, and including hinge means for pivotally connecting the outer edge of the diaphragm to the inner edge of the annulus, whereby energy stored in the negative Belleville spring may be applied between the load member and the reaction member, through the positive Belleville spring by an axial control force applied to the at least one finger.

2. The controlled force actuating system of claim 1, wherein the hinge means comprises, a wire of circular radial cross section nested in grooves formed in the inner edge of the annulus and the outer edge of the diaphragm, respectively.

3. The controlled force actuating system of claim 1, wherein the diaphragm includes a plurality of the fingers symmetrically disposed about the center of the annular portion.

4. The controlled force actuating system of claim 3, wherein the plurality of fingers are defined by slots having outer ends, the outer annular portion having an inner bearing edge at the outer ends of the slots.

* * * * *